A. E. BEASLEY.
STEERING WHEEL LOCK.
APPLICATION FILED NOV. 3, 1920.

1,395,083.

Patented Oct. 25, 1921.
2 SHEETS—SHEET 1.

Inventor
Alfred E. Beasley
By J. E. Thomas
Attorney

A. E. BEASLEY.
STEERING WHEEL LOCK.
APPLICATION FILED NOV. 3, 1920.
1,395,083.
Patented Oct. 25, 1921.
2 SHEETS—SHEET 2.
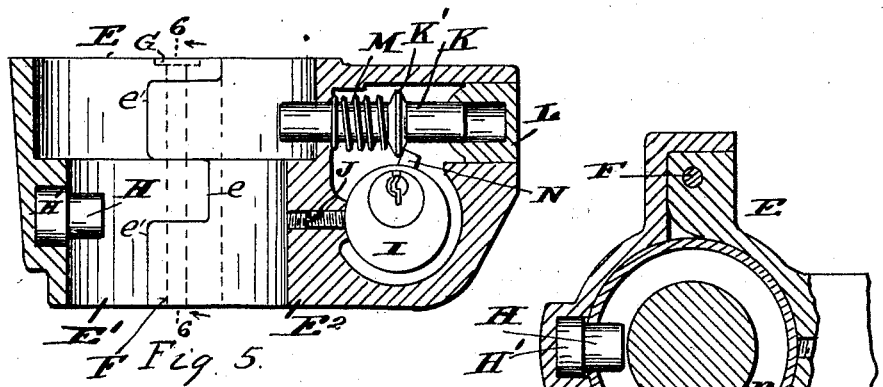
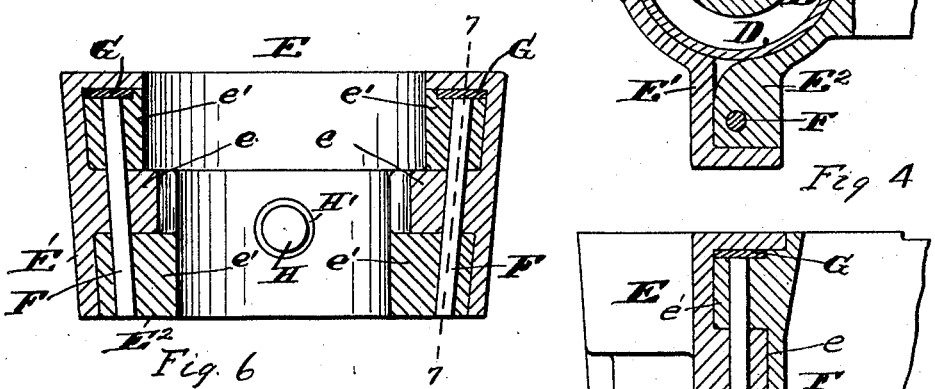
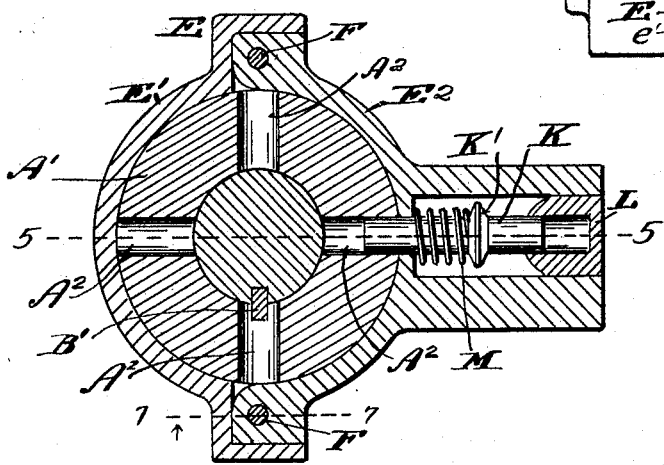
Inventor
Alfred E. Beasley
By S. E. Thomas
Attorney

UNITED STATES PATENT OFFICE.

ALFRED E. BEASLEY, OF TORONTO, ONTARIO, CANADA, ASSIGNOR OF ONE-HALF TO FRANK B. LEONARD, OF LOS ANGELES, CALIFORNIA.

STEERING-WHEEL LOCK.

1,395,083.   Specification of Letters Patent.   Patented Oct. 25, 1921.

Application filed November 3, 1920. Serial No. 421,493.

*To all whom it may concern:*

Be it known that I, ALFRED E. BEASLEY, subject of the King of Great Britain, residing at Toronto, county of York, Province of Ontario, Canada, have invented a certain new and useful Improvement in Steering-Wheel Locks, and declare the following to be a full, clear, and exact description of the same, such as will enable others skilled in the art to which it pertains to make and use the same, reference being had to the accompanying drawings, which form a part of this specification.

My invention relates to means for locking the steering wheel of a motor driven vehicle to prevent the use of the vehicle by an unauthorized person during the absence of the owner.

One of the objects of the present invention is an improvement in the general construction of the device shown in the application filed by Frank B. Leonard, on the seventeenth day of September, 1920, Serial Number 410,822 (in which I hold a joint interest) whereby it may be more readily and quickly installed upon the steering column of an automobile.

In carrying this object into effect a divided casting containing the locking mechanism is provided adapted to embrace the steering column of an automobile, the divided parts being so constructed and arranged that when in position they may be readily secured to the steering wheel column and joined together as a single unit.

With the foregoing and other objects in view which will appear as the description proceeds the invention further resides in the combination and arrangement of parts and in the details of construction hereinafter described and claimed, it being understood that changes may be made in the precise embodiment of the invention herein shown without departing from the spirit of the same.

In the drawings accompanying this specification:

Fig. 3 is a horizontal cross-sectional view taken on or about line 3—3 of Fig. 2 showing the bolt projecting into one of the radial holes of the steering wheel hub.

Fig. 4 is a horizontal sectional view taken on or about line 4—4 of Fig. 2 showing the divided portions of the casting assembled upon the steering column, and secured thereon to each other and to the column.

Fig. 5 is a vertical cross sectional view of the device detached from the steering column to show the parting line between the interlocking lugs of the respective elements and in dotted lines one of the pins for securing the parts together.

Fig. 6 is a vertical cross sectional view taken on or about line 6—6 of Fig. 5.

Fig. 7 is a fragmentary elevation of the device partly in section taken on or about line 7—7 of Fig. 3.

Figure 1:
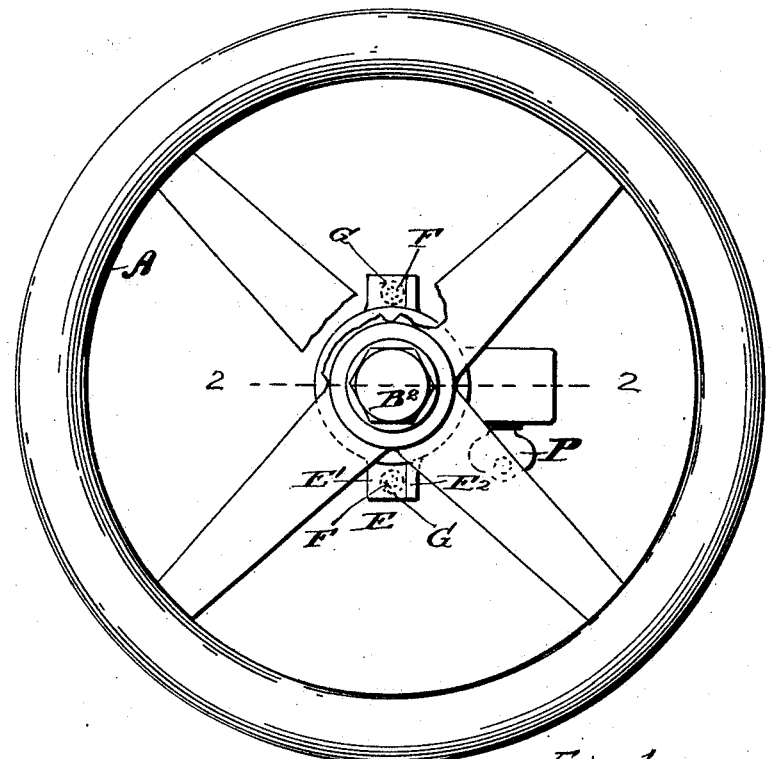
Figure 1 is a plan view of the steering wheel with parts of the spider frame broken away to show the locking device in position upon the steering column.
Figure 2:
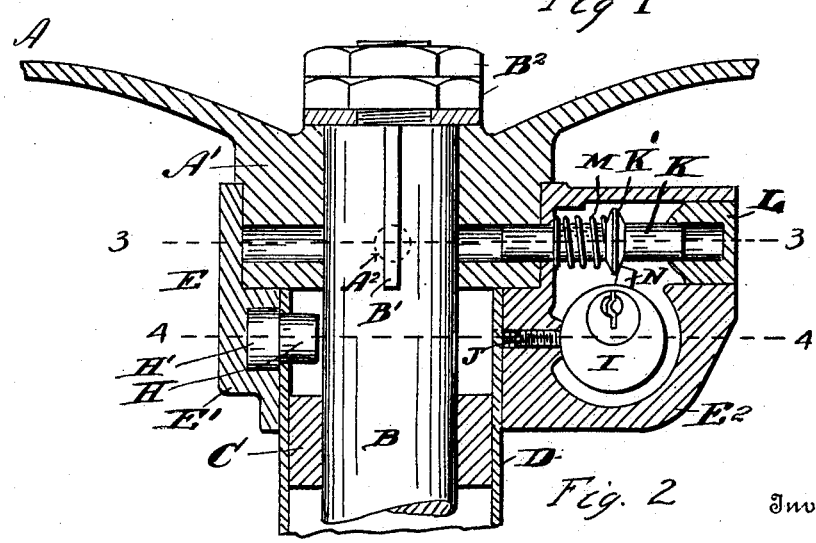
Fig. 2 is a vertical sectional view taken on or about line 2—2 of Fig. 1, showing the lock-bolt thrown to secure the steering wheel against operation by an unauthorized person.

Referring now to the letters of reference placed upon the drawings:

A, denotes a steering wheel, A' its hub provided with a plurality of radial holes $A^2$.

B, indicates the steering post upon which the hub is secured by a spline or key B' and the usual nuts $B^2$ engaging its upper threaded end.

C, is the usual bushing within the sleeve D through which the steering post extends. E, indicates a divided casting fitted to the sleeve D.

The divided casting E, comprises two interlocking elements E' and $E^2$ adapted to embrace the sleeve D, the parts being secured together by steel pins F projecting through alternating lugs $e$ and $e'$ formed in the interlocking ends of the connected elements of the casting. Upon assembling the parts to embrace the sleeve D the pins F, are driven upwardly through the casting, against a case-hardened steel thrust plate G, provided to receive the end of the pins that they may not be driven through the wall of the casting E;—which is preferably constructed of brass.

H, is a case-hardened stud having an enlarged head H', supported in a horizontal cylindrical socket in the wall of the casting E,—the top of the enlarged head being flush with the inner bore of the casting. The stud H projects through a hole bored in the sleeve D to secure the casting in position thereon,— its enlarged head overlapping the wall of the sleeve;—the stud being thus held in position should it become loose in the wall of the casting.

I, indicates a cylinder-lock secured in a bore in the casting E, by a screw or bolt J, extending through the wall of the element,— its end impinging upon the wall of the lock.

K, denotes a slidable lock-bolt housed in the element $E^2$ of the casting E,—adapted to enter one of the several holes $A^2$, in the steering wheel hub. The bolt K is supported at one end in a bushing L, driven flush with the outer wall of a bore in the casting E.

The locking bolt I is urged to its normal unlocked relation with the steering wheel hub by a spring M, which bears at one end against the wall of the element $E^2$ and at the other against a projecting rib K' formed on the bolt K.

N, denotes the projecting finger of a disk secured to the end of the rotatable cylinder of the lock I, and adapted to engage the rib K' on the locking bolt K to force the latter to the limit of its movement in either direction, by the manual operation of the key P.

Having thus indicated the several parts by reference letters the construction and operation of the device will be readily understood.

To assemble the lock on the sleeve of the steering column a hole is first drilled in the sleeve to receive the pin H, supported in the element E', of the casting E.

The element E' is then fitted to the sleeve and the co-acting element $E^2$ placed in position so that the lugs $e$ and $e$ of one element interlock with the lugs $e'$ and $e'$ of the opposing element.

The pins F are then driven through the apertures provided in the respective lugs $e$, $e$ and $e'$ $e'$ and the lower end of the pins when assembled being flush with the lower edge of the casting, as clearly indicated in Fig. 6 of the drawings.

The device is thus quickly and securely engaged to the steering column and is now ready for use, the holes $A^2$ having been previously bored in the hub of the steering wheel to receive the end of the locking bolt K.

To render the device inoperative for steering the owner of the vehicle upon leaving the car will first preferably turn the steering wheel so as to direct the traction wheels of the vehicle to the curb, or at an angle to the rear traction wheels. The key is then inserted in the lock and its cylinder carrying disc N is thereby rotated to force the bolt K into one of the holes $A^2$ in the steering wheel hub, thus locking the steering wheel until again released.

Having thus described my invention what I claim is:

1. In a device of the character described, the combination of a steering wheel assembly, a divided casting having a projecting stud adapted to enter an opening in the sleeve of the steering wheel column, whereby it may be secured thereto, pins extending through the divided casting whereby the divided portions of the casting may be connected together upon the sleeve of the steering column as a single unit, said pins terminating short of the top of the casting and thrust plates concealed within the casting and engaged by the upper ends of the pins, and a locking mechanism carried by the divided casting adapted to secure the steering wheel against rotation.

2. In a device of the character described, the combination of a steering wheel assembly, a divided casting a stud adapted to enter a hole provided in the sleeve of the steering column having an enlarged head supported in the wall of said casting, the top of the head being flush with the bore of the casting and overlapping the wall of the sleeve surrounding the hole to receive the stud, said divided casting having interlocking lugs, pins adapted to extend through holes in the respective lugs to secure the divided casting together as a single unit upon the steering wheel sleeve, thrust plates concealed within the casting adapted to receive the ends of the pins, and a locking mechanism carried by the casting adapted when manually operated to secure the steering wheel against rotation.

In testimony whereof, I sign this specification in the presence of two witnesses.

ALFRED E. BEASLEY.

Witnesses:
W. C. SLATEN,
LEOPOLD F. KLEIN.